United States Patent
Leitermann et al.

[11] Patent Number: 6,158,557
[45] Date of Patent: Dec. 12, 2000

[54] ROLLER SPINDLE ASSEMBLY AND BRAKE ACTUATOR INCORPORATING THE SAME

[75] Inventors: Wulf Leitermann, Hannover; Thomas Dieckmann, Pattensen; Joachim Beck, Albstadt; Wolfgang Klöblen, Reutlingen, all of Germany

[73] Assignee: Continental Aktiengesellschaft, Hannover, Germany

[21] Appl. No.: 09/119,039

[22] Filed: Jul. 20, 1998

[30] Foreign Application Priority Data

Jul. 23, 1997 [DE] Germany .................. 197 31 626

[51] Int. Cl.⁷ .................................... F16D 55/02
[52] U.S. Cl. .................. 188/71.8; 188/72.8; 188/162; 74/424.8 NA; 74/89.15
[58] Field of Search ................... 188/158, 157, 188/156, 162, 72.1, 72.7, 72.8, 74; 74/424.8 R, 424.8 NA, 89.15

[56] References Cited

U.S. PATENT DOCUMENTS

| | | | |
|---|---|---|---|
| 2,770,155 | 11/1956 | Morgan | 81/36 |
| 2,795,149 | 6/1957 | Morris | 74/424.8 NA |
| 4,192,398 | 3/1980 | Hunt | 180/178 |
| 4,392,557 | 7/1983 | Franke | 188/72.8 |
| 4,479,397 | 10/1984 | Jelinek et al. | 188/74 |
| 4,542,661 | 9/1985 | Teramachi | 74/424.8 NA |
| 4,809,824 | 3/1989 | Fargier et al. | 188/72.8 |
| 4,860,859 | 8/1989 | Yamatoh et al. | 188/72.1 |
| 4,920,817 | 5/1990 | Granbom | 74/424.8 NA |
| 5,107,967 | 4/1992 | Fujita et al. | 188/72.8 |

FOREIGN PATENT DOCUMENTS

| | | |
|---|---|---|
| 0023468 | 2/1981 | European Pat. Off. . |
| 0177702 | 4/1986 | European Pat. Off. . |
| 0302846 | 2/1989 | European Pat. Off. . |
| 2191678 | 2/1974 | France . |
| 3308149 | 9/1984 | Germany . |
| 54-120366 | 9/1979 | Japan . |

*Primary Examiner*—Michael Mar
*Assistant Examiner*—Mariano Sy
*Attorney, Agent, or Firm*—Walter Ottesen

[57] ABSTRACT

The invention relates to a roller spindle assembly (2) having a spindle rod (4) and a spindle nut (6) and roller bearings (10). The roller bearings are journalled between the spindle nut (6) and the spindle rod (4). The spindle rod (4) and the spindle nut (6) move relative to each other and, for a relative movement of the spindle rod to the spindle nut (6), the roller bearings (10) are displaced out of a start position. The roller bearings (10) are journalled in a cage (8) resiliently biased by a return spring (12). With the cage (8), the roller bearings (10) are guided back into the start position after a completed displacement from the start position when the spindle rod (4) and spindle nut (6) are at rest. In this way, it is not necessary to provide a conventional return of the roller bearings (10) with the aid of complex return-guide channels in the spindle nut (6).

9 Claims, 2 Drawing Sheets

ROLLER SPINDLE ASSEMBLY AND BRAKE ACTUATOR INCORPORATING THE SAME

FIELD OF THE INVENTION

The invention relates to a roller spindle assembly having a spindle rod and a spindle nut as well as roller bearings which are journalled between the spindle nut and the spindle rod. The spindle rod and the spindle nut are movable relative to each other and the roller bearings are displaced out of a start position with a relative movement of the spindle rod and spindle nut. The invention also relates to a brake actuator incorporating the roller spindle assembly.

BACKGROUND OF THE INVENTION

Roller spindle assemblies of this kind are already known in the state of the art and have a high efficiency because the roller bearings reduce the friction losses when there is a relative movement between the spindle rod and spindle nut. The roller bearings are journalled between the spindle rod and the spindle nut. The roller bearings are displaced out of their start position when the relative movement between the spindle rod and spindle nut takes place. The roller spindle assembly incorporates a roller bearing return guide in order to prevent the condition that the roller bearings leave the region between the spindle rod and the spindle nut and then drop out of their guide when there is a large relative displacement. A roller bearing return guide of this kind can, for example, be so configured that the forward roller bearing is pushed out of the guide between the spindle nut and the spindle rod, is guided back through the spindle nut and is again placed behind the last roller bearing into the guide between the spindle nut and the spindle rod. In this way, a cyclical guide of the roller bearings is provided in the spindle nut.

The relative movement between the spindle nut and the spindle rod is limited only by the length of the spindle rod because of the cyclical return of the roller bearings. The problem that the roller bearings drop out of their guide between the spindle nut and the spindle rod does not occur. However, spindle nuts having return channels are not suitable for a large serial utilization because they are complex to manufacture and are therefore expensive.

SUMMARY OF THE INVENTION

It is an object of the invention to provide a roller spindle assembly which has a high efficiency and can be simply and cost effectively manufactured. It is also an object of the invention to provide a brake actuator which incorporates the roller spindle assembly.

The roller spindle assembly of the invention includes: a spindle nut part; a spindle rod part defining a longitudinal axis; the spindle rod part and the spindle nut part conjointly defining an interface; a roller bearing system journalled at the interface for operatively interconnecting the spindle rod part and the spindle nut part so as to permit the parts to move relative to each other; the roller bearing system including a cage and a plurality of roller bearings journalled in the cage; the spindle rod part and the spindle nut part interacting with the roller bearings to displace the cage and the roller bearings away from a start position as the parts move relative to each other; and, means for resiliently biasing the cage in the direction of the longitudinal axis whereby the roller bearings are returned to the start position after being displaced when the spindle rod part and the spindle nut part have come to rest.

The basic idea of the invention is that a return guidance of the roller bearings does not take place during a relative movement between the spindle nut and the spindle rod; instead, the roller bearings are returned with the aid of the cage when the spindle rod and spindle nut are at rest. The cage is resiliently biased by a return spring and the roller bearings exhibit a slippage (that is, they do not necessarily roll) relative to the spindle nut and the spindle rod when returning to their start position.

The advantages achieved with the invention are especially seen in that return channels can be omitted because the return guidance of the roller bearings does not take place during a relative movement between the spindle rod and the spindle nut. Accordingly, the configuration of the roller spindle assembly is greatly simplified and the roller spindle assembly can therefore be manufactured at favorable cost.

A further advantage of the invention is seen in that the structural length of the roller spindle assembly is not increased compared to roller spindle assemblies of the state of the art because a return of the roller bearings into their start position takes place with the aid of the cage when the spindle rod and spindle nut are at rest. In this way, the roller bearings again assume the same start position for each renewed relative movement between the spindle nut and the spindle rod.

A further advantage of the invention is that the force transmission capability of the roller spindle assembly can be increased in that a large number of roller bearings is journalled in the cage and therefore a larger density of roller bearings is achieved. For this purpose, the basic configuration of the roller spindle assembly does not have to be changed.

The roller spindle assembly of the invention is especially advantageous when incorporated into a brake actuator for an electric brake system. The brake actuator includes an electric motor and a clamping arrangement in the form of a spindle drive which coacts with the electric motor. When the electric brake system is actuated, the electric motor is driven and the spindle nut of the spindle drive is rotated because of the rotation of the motor shaft of the electric motor. The spindle nut is connected to the motor shaft so that it rotates therewith. The rotation of the spindle nut is converted into an axial movement of the spindle rod and, with the aid of the spindle rod, brake pads are pressed against a brake disc so that a braking force is developed at the corresponding wheel to which the brake disc is allocated. Detail structure of the electric brake assembly is shown, for example, in U.S. Pat. No. 5,949,168, and incorporated herein by reference.

In the following, it will be shown why the roller spindle assembly is especially advantageous when incorporated into a brake actuator.

In a braking operation, the feed path between the start position of the spindle rod (start of the braking operation) and the end position of the spindle rod (position in which the brake pads are pressed with maximum force against the brake disc) is only approximately 1 mm. For such a small axial displacement of the spindle rod to the spindle nut (fixed in position), a return guidance of the roller bearings can be omitted during the relative movement of the spindle rod to the spindle nut because, for a small relative displacement of this kind, the problem does not exist that the roller bearings will drop out of their guide between the spindle nut and the spindle rod. The brake pads are minimally worn during a braking operation. In order to again adjust the same air gap between the brake pads and the brake disc after the braking operation is ended, the spindle rod is pushed back through a distance which is slightly less than the feed path when initiating the braking operation so that the spindle rod assumes a minimally different start position after the end of the braking operation than it had at the start of the braking operation. In this way, the roller bearings are moved back into the start position which they had assumed before the initiation of the braking operation by the return movement of the spindle rod. However, the roller bearings are pushed back into the start position (which they had before initiation of the braking operation), by the cage when the spindle rod and spindle nut are at rest. The cage is resiliently biased by the return spring. In this way, with the initiation of a new braking operation, the spindle rod is minimally displaced relative to the spindle nut but the roller bearings assume the same start position. With the increasing wear of the brake pads for a relatively large number of braking operations, there is a relative displacement of the start position of the spindle rod relative to the spindle nut of approximately 25 mm; however, the start position of the roller bearings always is the same.

According to another embodiment of the invention, the roller bearings are journalled with play between the spindle rod and the spindle nut. The advantage of this further embodiment is that the play of the roller bearings to the spindle rod and the spindle nut simplifies a return of the roller bearings with the aid of the cage when the spindle rod and spindle nut are at rest.

According to another embodiment of the invention, the spindle nut is provided with a stop which limits the displacement path of the cage and therefore the displacement of the roller bearings out of the start position. The advantage of this embodiment is that the roller bearings and the cage can only be moved through this displacement path relative to the spindle nut. In this way, it is precluded that a large relative movement takes place between the cage or roller bearings and the spindle nut which could lead to the condition that the roller bearings are guided out of their journalled positions between the spindle rod and the spindle nut. Preferably, when there is a stop in the roller spindle assembly, the return spring is mounted between the stop and the cage.

According to another embodiment of the invention, the return of the roller bearings into their start position with the aid of the cage can be reinforced by a vibration of the spindle rod and/or of the spindle nut. A vibration of this kind can be achieved in a brake actuator, for example, in that the electric motor is so actuated that the spindle rod is moved back and forth through a small distance. The spindle rod is not changed in average with respect to its position.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
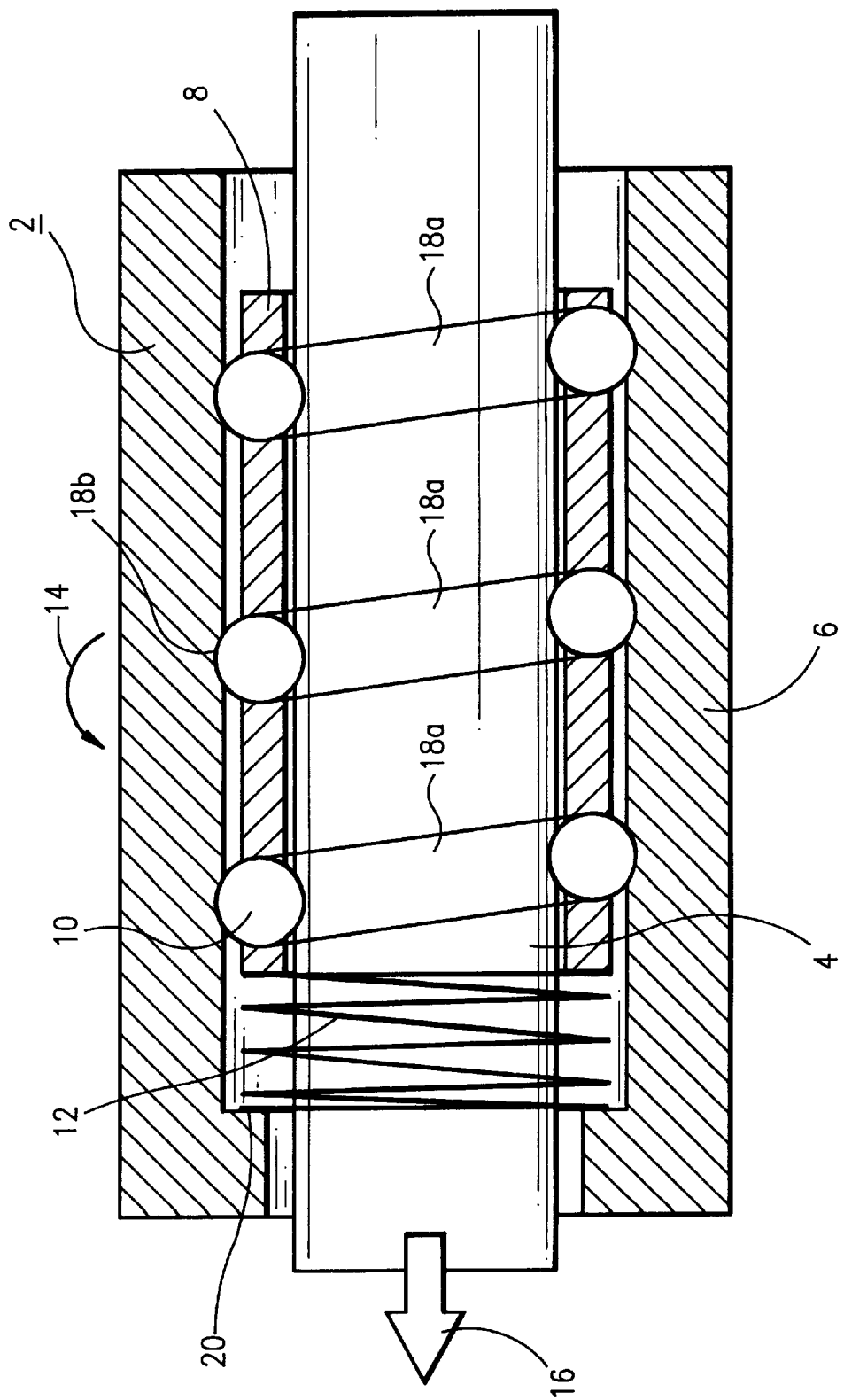
FIG. 1 is a schematic of a roller spindle assembly according to an embodiment of the invention.

In FIG. 1, the roller spindle assembly is identified by reference numeral 2 and includes a spindle rod 4 and a spindle nut 6. Roller bearings 10, in the form of ball bearings, are shown journalled between the spindle rod 4 and the spindle nut 6. For this purpose, the spindle rod 4 and the spindle nut 6 have respective helically-shaped grooves 18a and 18b. The grooves (18a, 18b) conjointly define a helically-shaped channel. The ball bearings 10 are held by a cage 8 which is likewise disposed between the spindle rod 4 and the spindle nut 6. The cage 8 axially surrounds the spindle rod 4 in the manner of a tube. The cage 8 is resiliently biased by a return spring 12 disposed between the stop 20 and the cage 8 and likewise axially surrounds the spindle rod 4.

In the following, it is assumed that the spindle nut 6 is not movable in the axial direction but is rotatably journalled about the longitudinal axis of the spindle rod 4. Further, it is assumed that the spindle rod 4 is journalled so that it cannot rotate but is axially movable in the direction of its longitudinal axis. This can be achieved, for example, with a fixed key mounted on the spindle slidably engaging a slot formed in a stationary frame. In this connection, reference can be made to U.S. Pat. No. 5,782,322, incorporated herein by reference. With these preconditions, the following takes place when there is a rotation of the spindle nut 6 in the direction of the arrow 14 about its longitudinal axis.

The roller bearings 10 roll in the respective grooves (18a, 18b) of the spindle rod 4 and the spindle nut 6 and there is an axial movement of the spindle rod 4 and the cage 8 with the roller bearings 10 disposed therein in the direction of arrow 16. The cage 8 travels through half of the distance that the spindle rod 4 travels. The return spring 12 located between the stop 20 and the cage 8 is pressed together under the influence of this axial movement. As shown in FIG. 1, the axial movement of the spindle rod 4, that is, the axial movement of the cage 8 with the roller bearings 10 is limited by the stop 20 when the roller spindle assembly 2 is actuated.

If no further torque is applied to the spindle nut 6, then the spindle nut 6 and the spindle rod 4 are at rest. In this load-free state, the return spring 12 can relax (expand) in a direction opposite to the direction of arrow 16 and, because of the relaxation of the return spring 12, the cage 8 with its roller bearings 10 is pushed back into the start position shown in FIG. 1. The roller bearings 10 again roll or slide in the grooves (18a, 18b) of the spindle rod 4 or the spindle nut 6. Thus, an axial and rotational movement of the cage 8 takes place. The start position is reached when the relaxed force of the spring and the friction of the roller bearings 10 reach equilibrium. If desired, a second stop can be provided at the region of the right-hand end of spindle nut 6.

The electric motor 32 (FIGS. 2a and 2b) can be actuated to impart a vibrational movement to the spindle rod by moving the spindle rod back and forth an incremental distance thereby assisting the return of the roller bearings to the start position.

For a renewed rotation of the spindle nut 6 in the direction of the arrow 14, there is again an axial movement of the spindle rod 4 and of the cage 8 with the roller bearings 10 contained therein. The cage 8 and therefore the roller bearings 10 again begin their axial movement out of the start position shown in FIG. 1.

It can be seen that the kinematic selected with respect to FIG. 1 is only chosen as an example. Alternatively, the spindle rod 4 can be rotatably journalled in lieu of the spindle nut 6. In this case, the spindle nut 6 is held so that it cannot rotate and is journalled to move axially. Accordingly, the spindle nut moves in an axial direction along its longitudinal axis when there is a rotation of the spindle rod 4.

Figure 2A:
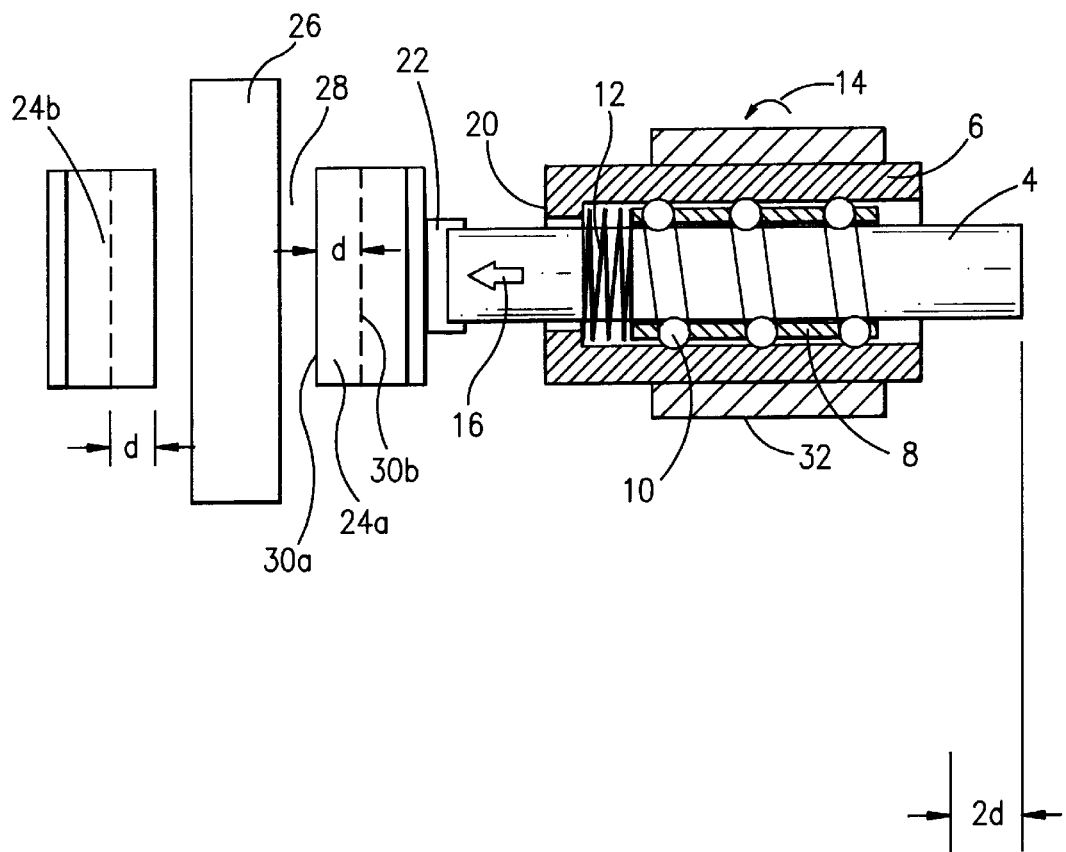
FIG. 2a is a schematic of a brake actuator shown in its rest position and incorporating the roller spindle assembly of FIG. 1; and, FIG. 2b is a schematic of the brake actuator of FIG. 2a shown after a braking operation has been completed.
Figure 2B:
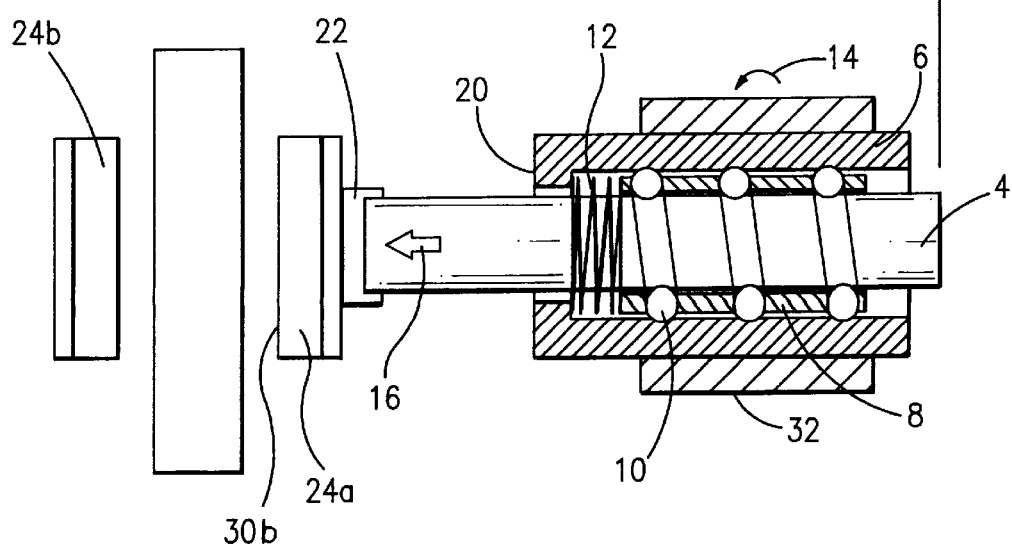

FIGS. 2a and 2b show a schematic of a brake actuator incorporating the roller spindle assembly of FIG. 1. The brake actuator includes an electric motor having a rotor 32 and includes a frame and additional structure as disclosed in U.S. Pat. No. 5,949,168, and incorporated here by reference.

FIG. 2a shows a brake actuator in its rest position before a braking operation. In a braking operation, a rotational movement is imparted to the spindle nut 6 by the electric motor 32 so that the spindle nut 6 rotates in a direction of the arrow 14 about its longitudinal axis. As explained with respect to FIG. 1, the spindle rod 4 is thereby set into axial movement and therewith also the brake piston 22 in the direction of arrow 16. As a consequence thereof, the brake pads (24a, 24b) move through the air gap 28 between the latter and the brake disc 26 and are pressed against the brake disc 26 so that a braking force is applied to the wheel assigned to the brake disc 26. The feed travel in the direction of arrow 16 of spindle rod 4 is approximately 1 mm during a braking operation. This feed travel distance comprises the width of the air gap and the elastic deformation in the brake disc and in the brake pads (24a, 24b).

During the braking operation, a minimum wear of the brake pads (24a, 24b) takes place so that the thickness of the brake pad 24a and of the brake pad 24b each reduces by an amount (d). After the braking operation is ended, the spindle rod 4 is driven back with the aid of the spindle nut 6 and the electric motor 32 to such an extent that the new end face 30b of the brake pad 24a (see FIG. 2b) assumes the same position as the old end face 30a (see FIG. 2a) before the braking operation. In this way, the same air gap 28 is set between the brake disk 26 and the brake pad 24a. In order to achieve this, the spindle rod 4 must only be driven back a distance which is reduced relative to the feed travel distance by the distance 2d.

After the braking operation, the spindle rod 4 assumes the position shown in FIG. 2b. The cage 8 with the ball bearings 10 held therein is also driven back when the spindle rod 4 is driven back into the position shown in FIG. 2b. Because of the spindle rod 4 being driven back, the cage 8 is driven back into a position which (when viewed in axial direction of the arrow 16) is minimally forward of the start position shown in FIG. 2a. A final return movement of the cage 8 and the ball bearings 10 held therein into the start position shown in FIGS. 2a and 2b is achieved via a relaxation of the return spring 12 when the spindle rod 4 and the spindle nut 6 are at rest. In the next braking operation, the axial displacement of the cage 8 with the bearings 10 starts again from the start position shown in FIGS. 2a and 2b.

The wear of the brake pads 24a and 24b is approximately 25 mm for both brake pads (24a, 24b) taken together during the service life thereof. Accordingly, the spindle rod 4 migrates in the course of the service life of the brake pads (24a, 24b) relative to the position shown in FIG. 2a as a consequence of the wear readjustment toward the left by about 25 mm. Nevertheless, the cage 8 assumes the same start position before each braking operation as is shown in FIGS. 2a and 2b.

It is understood that the foregoing description is that of the preferred embodiments of the invention and that various changes and modifications may be made thereto without departing from the spirit and scope of the invention as defined in the appended claims.

What is claimed is:

1. A roller spindle assembly comprising:

a spindle nut part;

a spindle rod part defining a longitudinal axis;

said spindle rod part and said spindle nut part conjointly defining an interface;

a roller bearing system journalled at said interface to operatively interconnect said spindle rod part and said spindle nut part so as to permit said parts to move relative to each other;

said roller bearing system including a cage and a plurality of roller bearings journalled in said cage;

said spindle rod part and said spindle nut part interacting with said roller bearings to displace said cage and said roller bearings away from a start position as said parts move relative to each other; and, biasing means for resiliently biasing said cage in the direction of said longitudinal axis whereby said roller bearings are returned to said start position after being displaced when said spindle rod part and said spindle nut part have come to rest.

2. The roller spindle assembly of claim 1, wherein said roller bearings are journalled with play between said parts.

3. The roller spindle assembly of claim 1, further comprising an electric motor for imparting a vibrational movement to one of said parts thereby facilitating the return of said roller bearings to said start position.

4. A roller spindle assembly comprising:

a spindle nut part;

a spindle rod part defining a longitudinal axis;

said spindle rod part and said spindle nut part conjointly defining an interface;

a roller bearing system journalled at said interface to operatively interconnect said spindle rod part and said spindle nut part so as to permit said parts to move relative to each other;

said roller bearing system including a cage and a plurality of roller bearings journalled in said cage;

said spindle rod part and said spindle nut part interacting with said roller bearings to displace said cage and said roller bearings away from a start position as said parts move relative to each other;

biasing means for resiliently biasing said cage in the direction of said longitudinal axis whereby said roller bearings are returned to said start position after being displaced when said spindle rod part and said spindle nut part have come to rest; and, said spindle nut part having a stop formed thereon for limiting the displacement movement of said cage along said longitudinal axis and therefor the displacement movement of said roller bearings away from said start position.

5. The roller spindle assembly of claim 4, said biasing means being a return spring interposed between said stop and said cage.

6. A roller spindle assembly comprising:

a spindle nut part;

a spindle rod part defining a longitudinal axis;

said spindle rod part and said spindle nut part conjointly defining an interface;

a roller bearing system journalled at said interface to operatively interconnect said spindle rod part and said spindle nut part so as to permit said parts to move relative to each other;

said roller bearing system including a cage and a plurality of roller bearings journalled in said cage;

said spindle rod part and said spindle nut part interacting with said roller bearings to displace said cage and said roller bearings away from a start position as said parts move relative to each other;

biasing means for resiliently biasing said cage in the direction of said longitudinal axis whereby said roller bearings are returned to said start position after being displaced when said spindle rod part and said spindle nut part have come to rest; and, means for imparting a vibrational movement to one of said parts thereby facilitating the return of said roller bearings to said start position.

7. A brake actuator for a vehicle brake having a brake pad defining a friction lining and a brake disc for coacting with the brake pad, the brake actuator comprising:

a frame;

an electric motor having a rotor defining a rotational axis;

means for rotatably journalling said rotor in said frame so as to be rotatable in a clockwise rotational direction and in a counterclockwise rotational direction;

a roller spindle assembly disposed in said frame and including: a spindle nut part; a spindle rod part defining a longitudinal axis; a first one of said parts being fixedly connected to said rotor so as to rotate therewith; said spindle rod part and said spindle nut part conjointly defining an interface; a roller bearing system journalled at said interface to operatively interconnecting said spindle rod part and said spindle nut part so as to permit the second one of said parts to move along said longitudinal axis relative to said first part; said roller bearing system including a cage and a plurality of roller bearings journalled in said cage; said spindle rod part and said spindle nut part interacting with said roller bearings to displace said cage and said roller bearings away from a start position as said parts move relative to each other; and, means for resiliently biasing said cage in the direction of said longitudinal axis whereby said roller bearings are returned to said start position after being displaced when said spindle rod part and said spindle nut part have come to rest; and, said second part being operatively connected to said brake pad thereby causing said brake pad to frictionally contact engage said brake disc when said second part is moved along said longitudinal axis.

8. A roller spindle assembly comprising:

a spindle nut part;

a spindle rod part defining a longitudinal axis;

said spindle rod part and said spindle nut part conjointly defining an interface;

a roller bearing system journalled at said interface to operatively interconnect said spindle rod part and said spindle nut part so as to permit said parts to move relative to each other;

said roller bearing system including a cage and a plurality of roller bearings journalled in said cage;

said spindle rod part and said spindle nut part interacting with said roller bearings to displace said cage and said roller bearings away from a start position as said parts move relative to each other;

said spindle nut part having a stop formed thereon for limiting the displacement movement of said cage along said longitudinal axis and therefor the displacement movement of said roller bearings away from said start position;

a return spring for resiliently biasing said cage in the direction of said longitudinal axis whereby said roller bearings are returned to said start position after being displaced when said spindle rod part and said spindle nut part have come to rest;

said return spring being interposed between said stop and said cage; and, means for imparting a vibrational movement to one of said parts thereby facilitating the return of said roller bearings to said start position.

9. The roller spindle assembly of claim 8, wherein said means for imparting said vibrational movement is an electric motor.

* * * * *